(No Model.)
J. F. RICHARDSON.
SHAFT SUPPORT.
No. 319,851. Patented June 9, 1885.
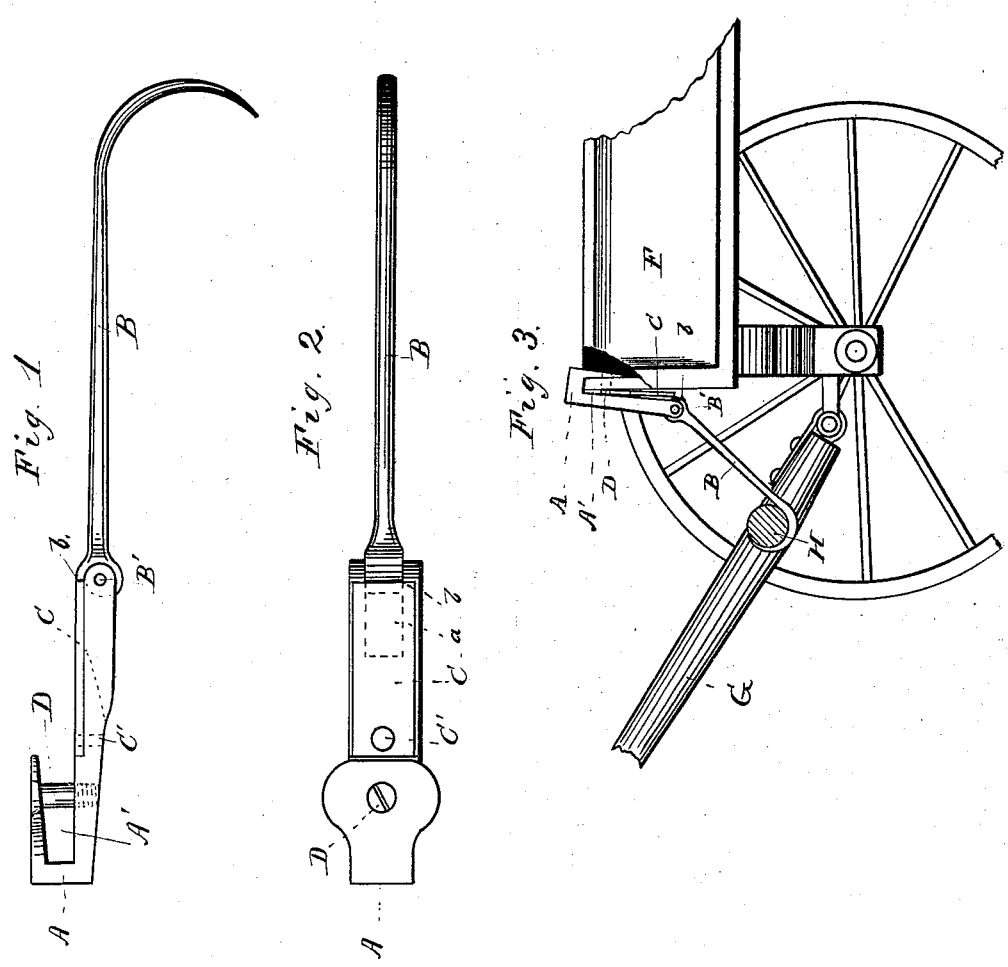
WITNESSES
Morton Toulmin
A.H. Semmes
INVENTOR
John F. Richardson
W.P. Leonard
*Attorney*

UNITED STATES PATENT OFFICE.

JOHN F. RICHARDSON, OF BOONVILLE, INDIANA.

SHAFT-SUPPORT.

SPECIFICATION forming part of Letters Patent No. 319,851, dated June 9, 1885.

Application filed April 30, 1885. (No model.)

*To all whom it may concern:*

Be it known that I, JOHN F. RICHARDSON, a citizen of the United States, residing at Boonville, in the county of Warrick and State of Indiana, have invented certain new and useful Improvements in Shaft-Holders, of which the following is a specification, reference being had therein to the accompanying drawings.

This invention relates to improvements in shaft-holders for carriages and buggies, and has for its object to hold the shafts or pole of a wheeled vehicle in an elevated position. This object is attained by the device illustrated in the accompanying drawings, forming a part of this specification, in which—

Figure 1 is a side view. Fig. 2 is a plan in which dotted lines indicate a slot, $a$. Fig. 3 is a side view of the device attached to a vehicle in the position to hold up the shafts.

The letter A indicates a piece of metal having a slot, $a$, (indicated by dotted lines,) which is pivoted, by means of a bolt or rivet, B', to a hooked-shaped piece of metal, B, having notch or shoulder $b$, which is intended to engage with a spring, C, by means of which the hook may be maintained in position when opened out to its full extent, or when at different angles to the part A. This spring is secured to the metal plate A by a rivet, $c'$, or in any other convenient manner.

The plate A is bent into the shape shown in Fig. 1, so as to leave an opening, A', which is intended to hook over the body F of a vehicle, and to be secured thereto by the screw D, as shown in Fig. 3.

G indicates a shaft of a vehicle. H is a cross-bar in section attached thereto in the usual manner.

Having described my invention, what I desire to secure by Letters Patent, and claim, is—

1. A metal plate adapted to hook over the front part of a wagon-body, provided with a bolt whereby it may be securely attached thereto, and a spring adapted to bear against and to maintain at different angles to said plate a metal hook pivoted thereto, for the purposes set forth.

2. The plate A, having an opening, A', a bolt, D, slot $a$, and spring C, secured thereto, in combination with a hook, B, having a notch, $b$, the said hook being pivoted to the plate A, in the manner herein described, and for the purposes set forth.

In testimony whereof I affix my signature in presence of two witnesses.

JOHN F. RICHARDSON.

Witnesses:
E. C. HARGRAVE,
E. L. PUETT.